United States Patent
Höglund et al.

(10) Patent No.: US 6,514,553 B1
(45) Date of Patent: *Feb. 4, 2003

(54) TUBING USED FOR ENCASING FOOD PRODUCTS AND A METHOD FOR MANUFACTURING THE TUBING

(75) Inventors: Boris Höglund, Hanko (FI); Edmund King, Hanko (FI); Vidar Kalm, Hanko (FI)

(73) Assignee: Oy Visco AB (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/386,813

(22) Filed: Feb. 8, 1995

Related U.S. Application Data

(63) Continuation-in-part of application No. 07/730,972, filed on Jul. 26, 1991, now abandoned.

(30) Foreign Application Priority Data

| Dec. 22, 1989 | (FI) | 896229 |
| Jul. 27, 1990 | (FI) | 903758 |
| Nov. 9, 1990 | (FI) | 905568 |

(51) Int. Cl.$^7$ .............................................. A22C 13/00
(52) U.S. Cl. ................... 426/410; 428/34.8; 138/118.1; 452/21; 53/258; 162/175
(58) Field of Search ...................... 428/34.8; 132/118.1; 206/802; 426/105, 278, 129, 135, 138, 410, 415; 452/21; 53/258; 162/176, 177, 175; 106/162, 163.1, 164, 168, 169, 196–197.2, 158

(56) References Cited

U.S. PATENT DOCUMENTS 2,105,273 A    1/1938   Smith ............................ 93/82
2,144,899 A    1/1939   Smith ............................ 93/94

(List continued on next page.)

FOREIGN PATENT DOCUMENTS

| DE | 3640234 | 6/1988 |
| JP | 174699/1989 | 7/1989 |

OTHER PUBLICATIONS

Tea & Coffee Trade Journal, vol. 149, No. 9, 1977, R. H. Martin: "The ongoing development of the teabag", pp. 16–17.

Chemical Abstracts, vol. 38, No. 8, Aug. 25, 1975 (Columbus, OH), p. 232, abstracts 62287w and Japanese Patent No. 74110907 (Nangoku Pulp Kogyo K.K.), Oct. 22, 1974.

Primary Examiner—Harold Pyon
Assistant Examiner—Sow-Fun Hon
(74) Attorney, Agent, or Firm—Rothwell, Figg, Ernst & Manbeck

(57) ABSTRACT

The invention is a method of manufacturing lightweight fibrous casings constructed of abaca paper substrates suitably wet-strengthened using viscose, or viscose and resin, and subsequently viscosed a second time, and the casings made by this method. The method of this invention employs an arrangement of a die and related apparatus for the single-sided viscosing of light weight paper substrates at increased machine speeds. The die arrangement of this invention provides superior impregnation of viscose during the casing manufacturing stage, ensures smooth surfaces of both the inner and outer casing surfaces and renders the need for double-sided viscosing unnecessary, or undesirable. This new arrangement of viscose die minimizes drag upon impregnating the paper matrix with viscose and during the subsequent crucial period before coagulation of the viscose and its regeneration into cellulose has been completed; so as to permit the casing to be stretched but not irreversibly.

11 Claims, 3 Drawing Sheets

U.S. PATENT DOCUMENTS

| | | | |
|---|---|---|---|
| 3,104,682 A | 9/1963 | Schenk | 138/128 |
| 3,135,613 A | 6/1964 | Underwood | 99/176 |
| 3,433,663 A | 3/1969 | Underwood | 117/621 |
| 3,547,662 A | 12/1970 | Chiu et al. | 99/176 |
| 3,645,760 A * | 2/1972 | O'Brien et al. | 99/176 |
| 4,195,054 A | 3/1980 | Nerellen et al. | 264/558 |
| 4,222,821 A | 9/1980 | Jones et al. | 162/16 YR |
| 4,303,711 A * | 12/1981 | Erk et al. | 428/36 |
| 4,590,107 A | 5/1986 | Bridgeford | 428/36 |
| 5,143,584 A * | 9/1992 | Hammer et al. | 1622/175 |
| 5,277,857 A * | 1/1994 | Nicholson et al. | 264/187 |

\* cited by examiner

TUBING USED FOR ENCASING FOOD PRODUCTS AND A METHOD FOR MANUFACTURING THE TUBING

This application is a continuation-in-part of application Ser. No. 07/730,972, filed Jul. 26, 1991, abondoned the disclosure of which application is expressly incorporated herein by reference.

BACKGROUND OF THE INVENTION

1. Field of the Invention

The invention relates to a method of manufacturing a fibrous cellulose casing and a casing manufactured by this method.

2. Description of Prior Art

Artificial cellulose casings, fibrous cellulose casings and fiber reinforced casings are manufactured from a long fiber paper base impregnated with cellulose which has been regenerated from viscose. Prior to viscose impregnation the paper is wet strengthened by the paper manufacturer, also using cellulose regenerated from viscose or alternatively using other wet strengthening materials such as polyamide epihalohydrin resins, polyvinyl alcohol, hydroxyethyl cellulose and various synthetically produced lattices either singly or in combination one with another. The chief reason for conferring this wet strength is to enable the paper to retain its integrity and withstand the subsequent heavy impregnation with the strongly alkaline viscose, which is applied by the casing manufacturer, and the subsequent strongly acidic cellulose coagulation and regeneration stage by which the casing is made.

Whereas the paper manufacturer may apply only one to six percent regenerated cellulose from viscose and/or other wet-strengthening resins calculated on the basis of total fiber weight to provide the necessary wet strength, the casing manufacturer usually applies a quantity of viscose of two to three times the total weight of the paper to construct the casing. For example, in the case of paper which weighs 21 $g/m^2$, the casing manufacturer would add an additional 42 to 63 $g/^2$ regenerated cellulose from viscose in making the casing, amounting to a total cellulose weight 63 to 84 $g/m^2$. Fiber-reinforced cellulose of this example would be commercially prepared or plasticized with a quantity of 20 to 25 percent glycerol and moisturized with 5 to 10 percent water, to prevent it drying out and becoming brittle prior to use, achieving an overall basis weight given of between 78,8 and 119 $g/m^2$.

The process for making the paper and the process for making casing are very different. For example, imparting wet-strength to the paper is relatively easy and inexpensive for the paper manufacturer, and may be carried on in-line, whereas wet strengthening is totally impracticable and prohibitively expensive for the casing manufacturer who requires the paper fully wet-strengthened from the outset of the casing manufacturing process.

The fiber of the paper substrate used to make fibrous casing is usually a carefully selected choice of abaca fibers, also known as manila hemp fibers, grown in either the Philippines or Ecuador, which are subjected to a chemical pulping treatment to remove non-cellulosic material and to soften the fibers for paper-making. A portion of this fiber may be provided by alternative plant fiber such as sisal, jute, or wood pulp, etc., but not without affecting the casing strength characteristics, usually in a negative way. Papers so prepared, of basis weight between 17 and 28 $g/m^2$, are well known in the art for manufacturing fibrous cellulose casings, in the range of size typically from 32 to 163 mm in diameter, or even larger, and usually the basis weight of the paper is increased, for example, from 17 to 19 $g/m^2$, from 19 to 21 $g/m^2$, from 21 to 23 $g/m^2$, and so on in stages, as diameter increases and the need for greater strength increases. This is because the weight of the sausage product increases exponentially as a function of a squaring of the radius of the sausage.

The casing manufacturer's process usually involves unwinding the paper, supplied in rolls by the paper manufacturer, from an unwind stand, by drawing and forming the paper into the shape of a tube with overlapping margins. The paper is drawn continuously about its longitudinal axis by bending actions with the assistance of metal guides, while sticking the margins together using viscose immediately prior to the impregnation with bulk viscose which makes up the reinforced cellulose wall of the casing.

The composition of the aqueous viscose solution varies but may comprise, for example, 7 to 8 percent (wt-%) cellulose, 30–33 percent (wt-%) sodium cellulose xanthate of xanthate sulphur, 4–5 percent (wt-%) sodium hydroxide and water, with a ball-fall viscosity of 50 to 70 seconds (130 mg steel ball of 3,175 mm diameter over a distance of 20 cm). A Hottenroth ripening (salt) index of 4 to 5 at a temperature of 25 to 30 degrees Celsius may be regarded typical.

Once impregnated, the viscose is coagulated and regenerated into cellulose by passing the impregnated tube through a sulfuric acid and salt bath, usually containing ammonium and sodium sulphate mixtures, followed by various acid and water wash baths to complete the regeneration and remove all remaining sulphur from the viscose. Acid strength may vary from 40 to 60 g/l and a salt strength between 180 and 260 g/l with respect to sodium sulphate and between 10 and 50 g/l with respect to ammonium sulphate may be regarded typical. Before drying this fiber-reinforced tube it is usually passed through a bath containing a dilute aqueous glycerol solution, of 10–20 percent strength, to act as a plasticizer for the cellulose. Drying is preferably conducted with the casing in an inflated condition. Tension throughout the casing machine is maintained such that the diameter of the casing at the outset, that is the diameter provided by the original width of paper in the roll, less that used for overlapping, is reproduced as far as possible in the finished casing tube.

Viscose impregnation may be effected by pouring the viscose onto the outer surface of the paper substrate, well ahead of the acid bath, in order to ensure that the paper is thoroughly impregnated prior to regeneration of the cellulose with acid. Alternatively, the paper-impregnation may be accomplished with a specially constructed viscose die, wherein the viscose is presented under pressure, through the lips of the die, directly onto the outer surface of the paper or substrate. The paper is temporarily supported during transit across the ??? lips by a metal ring or cylinder, the gap between ring and die being such as to allow the paper to pass unimpeded, but not of such a width as to fully dissipate the pressure of the viscose before impregnating the paper. Impregnation is completed by passing paper between the die and the supporting ring for some distance within fixed gap dimensions, and thereafter passing the paper for some distance unsupported through air before entering the acid coagulation and regeneration bath.

Such impregnations may result in a product in which the two surfaces of the paper are unequally viscosed, only one side being fully impregnated owing to the resistance to penetration of papers of 17 g/m² and greater; greater paper weight usually equating to greater resistance.

In still another variant, viscose may be supplied to both sides of the paper simultaneously in order to effect a so-called double-viscose coating. This ensures that the paper is properly covered by viscose prior to coagulation and regeneration of cellulose.

Cellulosic tubings produced in these various ways are tough and strong and have low stretch characteristics. For these reasons they may be used as containers or casings for sausages, meats, or other articles of food, particularly in applications where size, in terms of diameter control, is a critical parameter, and where a highly mechanized sausage stuffing plant places high demands for consistency of performance, and where strength with toughness is at a premium.

While exact size is achieved from a fibrous casing exhibiting low stretch, this also means that for differences in sausage diameter of only a few millimeters, another size of viscose die has to be used. This entails additional costs for the separate inventorying on the part of the paper supplier, the casing manufacturer and the sausage maker and for additional dies.

In parallel with the development of ever more demanding packaging equipment in technologically advanced countries, which as described above has placed ever greater demands on the casing producer to make tougher, stronger and more-size consistent casing (which demands have been met by the fibrous cellulose casing manufactures), collagen and cellophane casings, or pure cellulose casings unreinforced by a fibrous substrate have been developed for less critical market areas where exact size is not the first or most important selection criterion, but rather flexibility of use and unit cost are more important considerations.

These developments have been divergent rather than convergent, which is to say a gap exists between the two types of casing markets. For example, a highly flexible casing of consistent though by no means exceptional strength maybe required for mechanized stuffing machinery without subsequent packaging equipment also demanding exact size. In this example collagen casing would have provided the right price level but would not have provided the strength and associated low produce breakage rate characteristic of a fibrous casing, and the fibrous casing would be considered over-engineered and too costly.

Prior art improvements in casing manufacture usually focused on improving the wet strength or reducing the variability of strength of paper substrates typically of the order of 20 to 23 g/m², so that a more consistent casing size or strength could be achieved. The use of polyamide-epihalohydrin resin and cationic polyethylene imine resin to provide an improvement in the alkaline wet tensile paper properties, in the U.S. Pat. No. 4,222,821 is one such example.

Another example is U.S. Pat. No. 3,433,633 which seeks to improve the quality of the viscose-bonded or wet-strengthened manila hemp paper substrate for subsequent fibrous cellulose casing manufacture by using cellulose derivatives of high viscosity to provide stronger casings. The implication of U.S Pat. No. 3,433,633 is that the existing 22.7 g/m² substrates lack sufficient strength, and therefore teach away from the use of lower substrate paper basis papers.

In recent years patent specifications have sought to apply wet strengthening systems other than those based on viscose to treat the fibrous abaca fibers by employing a variety of resin-based systems. U.S. Pat. No. 5,063,104 filed in 1990 is an example which highlights how physical properties of paper may be affected in a dramatic or significant manner depending upon what wet strengthening binder or bonding method is substituted for viscose. One property which is adversely affected by the use of resins as wet-strengthening agents is paper stretch or elongation. Reductions of up to 20 to 50 percent for wet elongation, as compared to elongation properties for viscose bonded paper, were demonstrated in this patent. Fibrous casing elongation is very much dependent on the substrate paper's elongation.

In order to make fibrous casings of ever-increasing diameter and therefore ever greater strength, the use of ever-increasing substrate paper basis weights and/or the use of strength adjuncts to complement viscose bonded casings, typically manufactured from paper having weights of 17 g/m2 and greater, had been required. This trend of using heavier weight paper to make wider diameter casings has as a corollary the fact that small diameter casings may be manufactured using papers with lower basis weight. However, in using low weight papers a limit is approached by virtue of the fact that a certain minimum paper strength in both dry and wet states is required so that the paper will withstand draw tension applied when it is unwound from its roll (dry strength), and thereafter possess sufficient strength, following impregnation with the viscose of the casing manufacturer's process, so that it may successfully be converted into the casing product (wet strength).

Following the impregnation, the substrate paper tube, now saturated with viscose, has minimum strength and spends much of its time during its subsequent passage through the casing manufacturing machine as a flattened tube. The greater the surface area of this tube over turn-over rolls, which are used in the machine to convey it, and not all of which are necessarily driven, the less paper strength is required. These requirements for strength may be considered at variance: Manufacture of larger diameter casings using lighter weight substrate paper is relatively easy due to the large surface areas involved, but these casings do not perform robustly due to the high strength demands associated with large diameter casings compared to the low strength of the lighter-weight papers. Conversely, manufacture of narrower casings must be accomplished with heavier paper due to the relatively low surface areas involved, but narrow diameter casings may provide more strength than is required of the sausage-maker and be considered over-engineered and expensive.

In order to obtain the desirable physical property mix of the present invention using resin-bonded papers having lower wet extension or elongation properties compared to papers wet strengthened with viscose (prior to the viscose impregnation applied by the casing manufacturer), it had been found that substrate paper weights need to be reduced from 13 to 15 g/m² to preferably 10 to 12 g/m² when manufacturing processes are employed. Use of these light papers in conventional viscose dies (engineered with robust and heavy papers in mind) causes an undesirable "necking-in" of the casings necking-in is brought about by a simultaneous extension of the tube in its longitudinal direction and a commensurate shrinkage in its transverse direction, which reduces the diameters of the casings from those defined by the die size. Absent steps taken to overcome this obstacle, the process of reducing paper weight to obtain more casing trans-directional extension becomes self-defeating: In order to overcome these difficulties while without reengineering the viscose dies used and designed for heavier paper substrates it is necessary to slow down the entire casing manufacturing operation thereby to reduce stress on the lightweight paper. This approach is generally not convenient or economically feasible in that additional costs are likely to be incurred as a result of slow processing.

DESCRIPTION OF THE DRAWINGS

The invention is now described in more detail with reference to the accompanying drawings in which.

SUMMARY OF THE INVENTION

Figure 1:
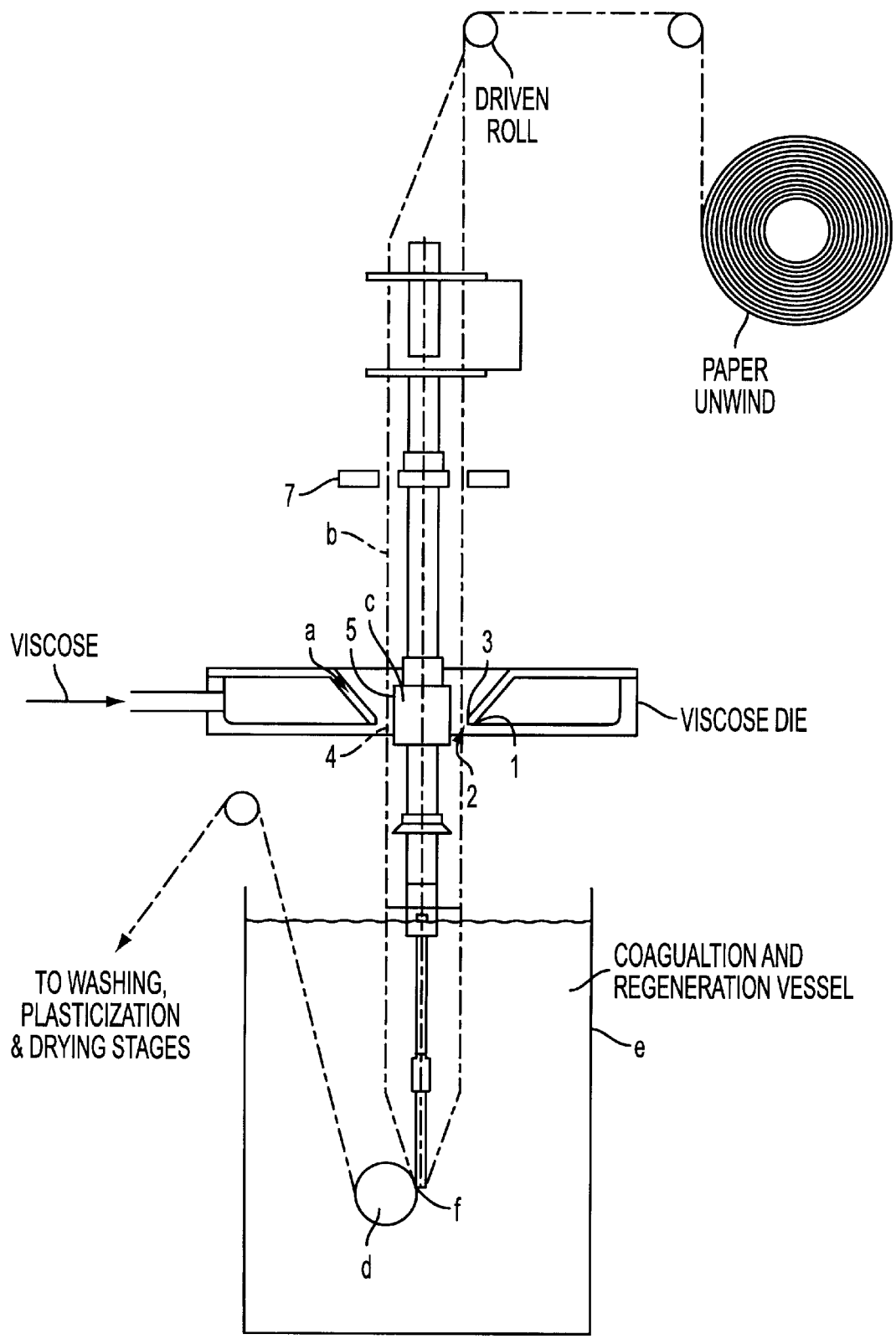
FIG. 1 is a schematic representation of the apparatus by which tubing is manufactured by first forming the substrate paper into a tube and impregnating it with viscose at a die ahead of the acid coagulation and cellulose regeneration bath.
Figure 2:
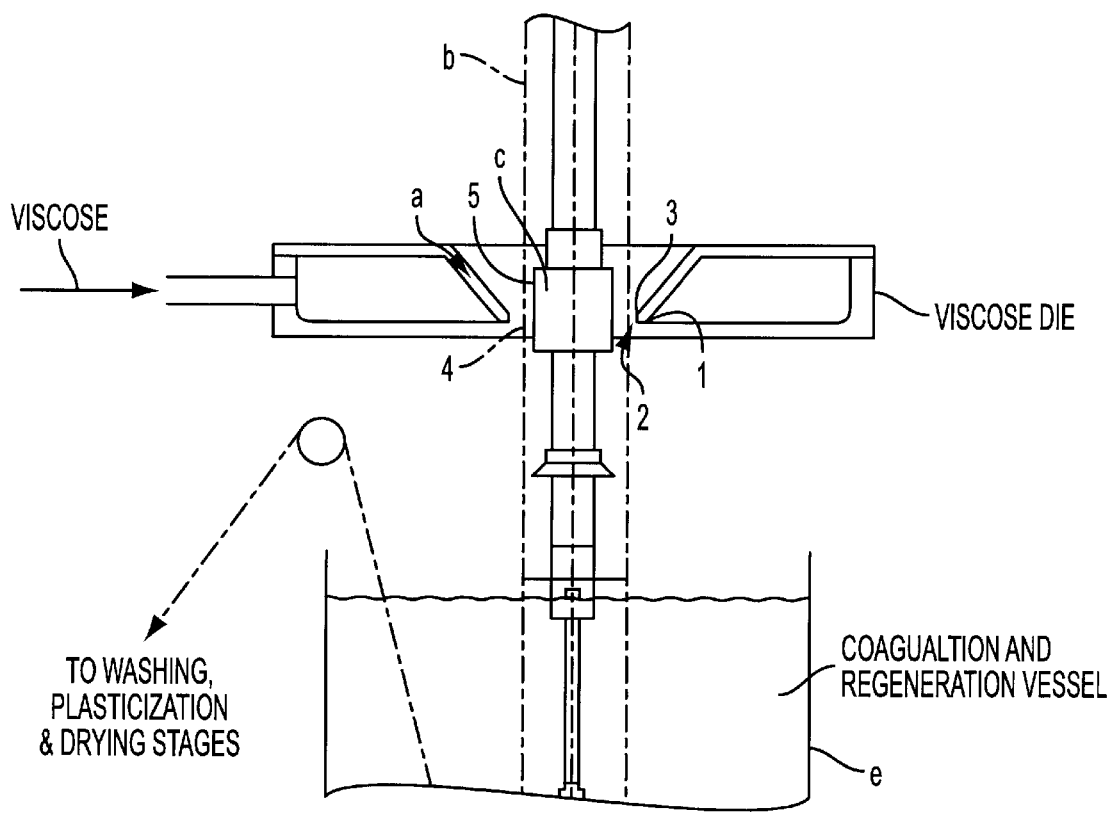
FIG. 2 depicts the viscose die of FIG. 1 in greater detail.
Figure 3:
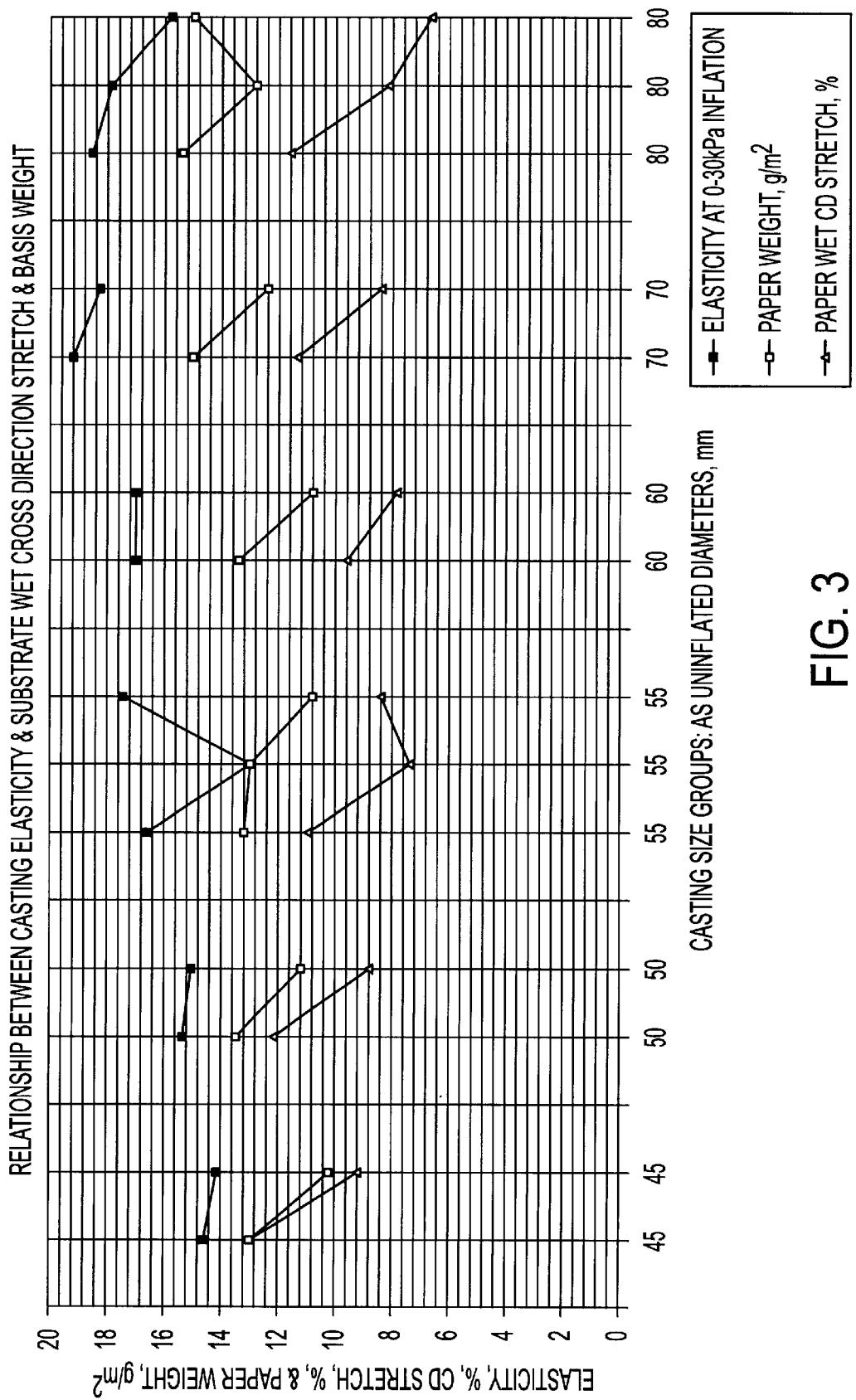
FIG. 3 is a diagram showing the relationship between casing elasticity, paper weight and paper wet stretch of tubing known in the art and tubing made according to this invention.

The invention is a method of manufacturing lightweight fibrous casings constructed of abaca paper substrates suitably wet-strengthened using viscose, or viscose and resin, and subsequently viscosed a second time by the casing manufacturer, and the casings made by this method.

The method of this invention employs an arrangement of a die and related apparatus which has been developed for the purpose of accomplishing single-sided viscosing of light weight paper substrates at increased machine speeds. The die arrangement of this invention provides superior impregnation of viscose during the casing manufacturing stage, ensures smooth surfaces of both the inner and outer casing surfaces and renders the need for double-sided viscosing unnecessary, or undesirable. This new arrangement of viscose die minimizes drag upon impregnating the paper matrix with viscose and during the subsequent crucial period before coagulation of the viscose and its regeneration into cellulose has been completed; so as to permit the casing to be stretched but not irreversibly

DETAILED DESCRIPTION OF PREFERRED EMBODIMENTS

The present invention combines of the consistency of properties of the fibrous casing with the elasticity equal to if not superior than that of collagen casing, while being price competitive. Abaca (manila) paper wet-strengthened using regenerated cellulose from viscose, in a basis weight of no more than 15 g/m$^2$, and preferably 13 g/m$^2$, is used as the long fiber reinforcement to produce a lightweight fibrous casing product of exceptional elasticity properties combined with an exceptional strength to weight ratio, possessing an exceptionally smooth inner surface.

Another embodiment of this invention relies on alternative wet-strengthening systems not incorporating viscose alone.

Because the present invention combines high elasticity at a good weight to strength ratio it will be able to compete in markets which were previously unavailable to the fibrous cellulose casing, and were more traditionally served by collagen or pure cellulose casing. The present application describes a method to overcome the problems associated with reduced paper stretch which arises from the paper manufacturing process and process chemistry, that is insofar as the paper is treated, in order to make it strong and resistant to alkalis and acids in the wet state for the casing manufacturer's purposes.

The present application's specification presents paper substrates of 13 to 15 g/m$^2$ to make a range of light-weight casings of about 32 mm diameter and greater. The goals of the present invention are achieved by minimizing the wet strengthened paper substrate-metal surface contact in the area of the die, and by judicious overfeeding of the paper to the inlet side of the die on the one hand, while at the same time carefully controlling the paper draw or tension on the impregnated web on the lead-out side of the die on the other, to minimize the longitudinal extension of the substrate paper and obtain the subject paper embedded within the casing in a non-extended fashion. This new arrangement of viscose die, designed expressly for the purpose of impregnating lightweight papers in the 10 to 15 g/m$^2$ range at line speeds faster than those previously used for treating lightweight paper substrates, will now be described with reference to FIG. 1, against the background of those of the prior art which are regarded less than ideal for the subject casings.

Paper, providing the casing substrate, is unwound from rolls delivered by the paper supplier in lengths of for example 10,000 meters, that is from paper rolls of weights from about 10 to 50 kg. With the assistance of paper unwind rolls, some of which are driven, the substrate paper is fed to the viscose die over metal guides where it is formed into a tube in such a manner as to keep the die overfed with paper. The dimensions of the die are critical for the reasons previously indicated, i.e., since they impinge on paper extension properties which are affected by frictional forces, or drag, in the region of the die directly following viscose-impregnation, and an important objective of the present application is to reduce the effects of such frictional forces to a minimum. (Many of the die arrangements described in the prior art appear without dimensions, except insofar as drawings of dies are presented. Actual dimensions are often absent, and where actual dimensions have been given, most notably in connection with so-called double-sided viscosing methods, which are not directly relevant to the present application, the ranges have been so wide as to describe non-critical situations). U.S. patent application Ser. Nos. 2,105,273 and 2,144,900 which appeared Jan. 8, 1938 and Jan. 24, 1939 are good examples of the former which is for many years undoubtedly represented the state of the art of viscose die technology and indeed of fibrous casing manufacture. Sizing the dies of these specifications from their drawings suggested they are of a low viscose pressure type since drawings suggest they are of a low viscose pressure type since the gap between the list of the die, corresponding to dimension of 2.5 to 3.0 mm for a die to produce a 45 mm casing.

The die described in these prior art specifications would be regarded as of robust design usually suitable to the requirements of substrate papers in the 21 to 28 g/m2 basis weight interval, which characterized fibrous casing manufacture in the era under review. Such dies would not be expected to give rise to good viscose penetration of the paper substrate, and so it is not surprising that subsequent improvements tended to focus on higher pressure die technology, using narrower gaps between the lips of the dies to increase viscose velocities, and increasingly to focus attention on double-sided viscosing as in, for example U.S. Pat. No. 3,709,720, where the two impregnations with viscose are conducted within a second or a fraction of a second of each other where Kindl, its author, claims the apparatus such as that used in U.S. Pat. No. 2,105,273 for single-sided viscosing, required adequate time for the viscose to penetrate the paper properly before beginning the cellulose coagulation and regeneration stages under acid, otherwise the poor penetration would have resulted in casings being produced of inferior strength and poorer transparency than where effective saturation of the tube with viscose is first carried out.

The present invention retains the excellent viscose penetration properties offered by the higher pressure type of die, and thereby contains distances between die and coagulation baths to short distances of the order of 0.3 to 0.6 meters, but only by relying on the need for a single sided viscose impregnation in order to reduce drag between viscosed paper substrate/metal surface contact/viscose pressure forces in the area of the die involved with viscose penetration, that is at the lips of the die and directly following them. In order to reduce the effects of drag, paper lead-in and lead-out distances into and out of the area of viscose issue, from the lips of the die, have been kept small, and balanced with machine line speeds and paper basis weight, in an attempt also to achieve the best possible viscose penetration. Accordingly, based on a fixed gap through which the viscose passes of 0.5 mm, dimension 1 in FIG. 1, the gap between the lips of the die, both upwards and downwards in cylindrical disposition with the formed tube of paper and the face of the supporting metal ring or cylinder, "c", is fixed at 0.5 to 0.7 mm and preferably 0.55 to 0.60 mm and regarded critical within the context of the other specified dimensions. This has been found suitable to accommodate the relatively narrow range of substrate paper thicknesses, in the range 50 to 80 $\mu$m, and generally thinner than those of the prior art for 17 to 28 g/m$^2$ substrates.

It will be appreciated that the effects of frictional factors increase as basis weight decreases, while increased line speeds, which of necessity involve also increased draw or paper web tension, directly following viscose impregnation, since the draw is applied after the turn-over roll, "d" in FIG. 1, also increase the effects of friction. The paper lead-in distance, dimension 3, FIG. 1 has accordingly been set at between 10 mm and 5 mm in one preferred arrangement of the dies of the present application depending on the basis weight of paper impregnated and the line speed used. With reasonable line speed running, viscose flow from the point of issue from the lips of the extrusion die, is predominantly downward with the paper making a seal backwards from the die upper "a" between paper "b" and paper support "c" with viscose. Similarly, on the lead-out side of the die, the lip width, dimension 2 in FIG. 1, of the present application, should be between 10 mm and 2 mm in conjunction with a paper support ring, "c" in FIG. 1, of 10 to 25 mm in length, supporting the paper on its approach to the area of influence of the die's upper lip and extending to a distance horizontal ±1–2 mm with the lower end of the lower lip in order to contain frictional effects, the combined result of paper/viscose/metal contact-surface interactions which in turn interact with line speed and paper tension effects.

Despite the reduced metal surface contact of the lower lips of these new die arrangements and also of the metal ring paper support element, herein described, together with relatively short distances for the impregnated web to travel before entering the acid bath, but conducted at acceptably high speeds from the commercial standpoint as indicated elsewhere, no loss of quality is observed for the subject fiber reinforced casings either in terms of transparency, strength properties or otherwise. Indeed, rather the converse can be claimed and casings result which possess exceptionally good transparency, exceptionally high weight to strength ratios, and where there exists good evidence by way of Bendtsen smoothness measurements to suggest the physical property mix of the subject casings are of a superior order. So specified the die may be used to advantage to produce the subject casings in the paper basis weight interval from 15 to 10 g/m$^2$ and while the longer metal-surface traverse, denoted as dimensions 2 and 3 in FIG. 1, of respectively 10 and 10 mm at one end of the range, may be regarded as appropriate for the impregnating of 12 to 15 g/m$^2$ substrates at line speeds of up to 10 meters/minute, the shorter metal-surface traverse of 6 and 2 mm is regarded more appropriate for the impregnating of 10 to 13 g/m$^2$ substrates at line speeds of 10 meters per minute and greater.

The benefit of these new die arrangements then, as will be shown shortly by way of examples, is to obtain similar casing tube extension properties from paper substrates which rely more exclusively on resins such as the polyamide epihalohydrin types for their wet strength rather than on small amounts of these together with the use of regenerated cellulose from viscose, or alternatively of regenerated cellulose from viscose used alone. That is because papers wet strengthened with resins possess inherently less stretch at a given basis weight. To compensate for this reduced substrate paper stretch, paper basis weight has been reduced to a level of up to 30 to 40 percent lower, which advantage is lost unless the said paper can be treated in a manner which engenders less machine or longitudinal direction tension during the crucial stages of paper impregnation, viscose penetration of the substrate, coagulation of the cellulose of the viscose and its attendant regeneration. Without the use of the new die arrangement the lighter-weight substrates tend to stretch excessively in their machine directions, particularly for smaller diameter casings running at high line speeds, which has the simultaneous effect of reducing their capacity for stretching in their cross directions.

To understand the effect this has on casing strength one needs to consider the strength parameter of "toughness", alternatively referred to as "Tensile Energy Absorption" for which internationally recognized standards, such as that put out by TAPPI, the Technical Association of the Pulp and Paper Industry in the United States of America, under the reference: T494 om-81, and cross referenced with other standards published elsewhere. Simply put the toughness of a material may be defined as the work done when the specimen is stressed to rupture, in tension under prescribed conditions, as measured by the integral of the tensile stress over the range of tensile stretch from zero to maximum strain. It is also clear from a study of the stress-strain properties of the substrate paper of fibrous casings that while the paper possesses higher tensile strength in its machine, or length direction, compared to its cross direction, the paper may be said to be equally as tough in both directions by virtue of possessing more stretch in its cross compared to this length direction: that is the areas under their respective stress-strain curves are the same. Classical mechanics demands twice the strength in the hoop of a tube or hose compared to its length direction for good performance and a paper substrate possessing minimum sheet directionality has been the best approximation so far reached with cellulose-based material, and it is the cross direction strength which is crucially important in a casing for subsequent meat stuffing and casing expansion purposes. Anything which detracts from maximizing the cross toughness of a casing product, or anything which has the effect of reducing the size expectations from a given die-paper combination must be deemed to be counter productive. For these reasons the chief objective of the present application has been to produce casing products as far as possible similar to those in the original specification in terms of their stretch and performance properties but using so-called resin(s)— and viscose plus resin(s), as opposed to viscose-bonded paper substrates, using either dies of the prior art under certain operating conditions or the new die arrangements herein described, with improved performance.

EXAMPLES

Examples will now be presented which describe the tube properties sought.

TABLE 1

CASING ELASTICITY PROPERTIES AS A FUNCTION OF CASING SUBSTRATE PAPER WEIGHT AND TYPE: VISCOSE PLUS RESIN - VERSUS RESIN(S)- WET STRENGTHENED

| Casing size, diameter, mm/ Paper Bonding Type | Substrate Paper Basis Weight, g/m² | Paper Wet Cross Direction Stretch, % | Casing Weight g/m² | Casing Elasticity at 0–30 kPa Inflation |
|---|---|---|---|---|
| 45/Viscose* | 13.0 | 13.0 | 74.6 | 14.6 |
| 45/Resin(s) | 10.2 | 9.2 | 72.5 | 14.1 |
| 50/Viscose* | 13.5 | 12.1 | 70.3 | 15.3 |
| 50/Resin(s) | 11.2 | 8.8 | 73.0 | 15.1 |
| 55/Viscose* | 13.2 | 11.0 | 72.2 | 16.7 |
| 55/Resin(s) | 13.0 | 7.4 | 77.4 | 13.2 |
| 55/Resin(s) | 10.8 | 8.4 | 73.8 | 17.5 |
| 60/Viscose* | 13.4 | 9.6 | 74.4 | 17.0 |
| 60/Resin(s) | 10.7 | 7.8 | 73.6 | 17.0 |
| 70/Viscose* | 14.9 | 11.3 | 78.2 | 19.2 |
| 70/Resin(s) | 12.4 | 8.0 | 76.2 | 18.3 |
| 80/Viscose* | 15.4 | 11.6 | 74.6 | 18.5 |
| 80/Resin(s) | 12.7 | 8.1 | 71.5 | 17.9 |
| 80/Resin(s) | 15.0 | 6.7 | 82.6 | 15.7 |

*Viscose here refers to viscose plus a small amount of a polyamide epihalogenhydrin resin, which resin can be seen not to affect substrate paper cross direction stretch, to an appreciable extent compared to the resin(s) of the exclusively resin(s)-bonded substrates, and indeed the higher values are typical of predominantly viscose-bonded paper whilst the lower typical of paper bonded without viscose.

TABLE 2

CASING ELASTICITY PROPERTIES AS A FUNCTION OF CASING SUBSTRATE PAPER WEIGHT AND TYPE: VISCOSE PLUS RESIN- VERSUS RESIN(S)-WET STRENGTHENED.

| casing size, diameter (d)mm | paper base weight (w) g/m² | casing weight g/m² | casing burst strength (b) kPa | strength quotient (SQ) b/w | burst coefficient SQ · d · pi/ 100* |
|---|---|---|---|---|---|
| 45/Viscose* | 13.0 | 74.6 | 78 | 6.0 | 8.5 |
| 45/Resin(s) | 10.2 | 72.5 | 66 | 6.5 | 9.1 |
| 50/Viscose* | 13.5 | 70.1 | 77 | 5.7 | 9.0 |
| 50/Resin(s) | 11.2 | 73.0 | 79 | 7.1 | 11.1 |
| 55/Viscose* | 13.2 | 72.2 | 71 | 5.4 | 9.3 |
| 55/Resin(s) | 10.8 | 73.8 | 68 | 6.3 | 10.9 |
| 60/Viscose* | 13.4 | 74.4 | 70 | 5.2 | 9.8 |
| 60/Resin(s) | 10.7 | 73.6 | 57 | 5.3 | 10.0 |
| 70/Viscose* | 14.9 | 78.2 | 65 | 4.4 | 9.7 |
| 70/Resin(s) | 12.4 | 76.2 | 53 | 4.3 | 9.5 |
| 80/Viscose* | 15.4 | 74.6 | 54 | 3.5 | 8.8 |
| 80/Resin(s) | 12.7 | 71.5 | 52 | 4.1 | 10.3 |

*Viscose here refers to viscose plus a small amount of a polyamide epihalogenhydrin resin.

TABLE 3

TUBING SMOOTHNESS PROPERTIES OF SUBJECT LIGHT-WEIGHT TUBINGS: Viscose* versus Resin bonded Substrate Paper

| | | | BENDTSEN SMOOTHNESS, cm3 air/minute | |
|---|---|---|---|---|
| PRODUCT diam. mm | Paper Weight, g/m² | Tube Wt. g/m² | Inside Surface | Outside Surface |
| 45 resin(s) | 11.0 | 72.8 | 750 | 170 |
| 45 viscose* | 13.0 | 73.2 | 950 | 190 |
| 50 resin(s) | 11.0 | 67.6 | 725 | 155 |
| 50 viscose* | 13.5 | 64.0 | 900 | 220 |
| 55 resin(s) | 11.0 | 74.7 | 900 | 145 |
| 55 viscose* | 13.5 | 70.0 | 850 | 220 |
| 60 resin(s) | 12.0 | 72.7 | 900 | 125 |
| 80 viscose* | 14.5 | 73.1 | 850 | 160 |

*Viscose here refers to viscose plus a small amount of a polyamide epihalogenhydrin resin.

TABLE 3A

| PRODUCT | BENDTSEN SMOOTHNESS | | | cm3 air/minute | | |
|---|---|---|---|---|---|---|
| STEM | Subject Tubing | | | prior Art Tubing | | |
| diameter mm | Weight g/m² | Inside Surface | Outside Surface | Weight g/m² | Inside Surface | Outside Surface |
| 45 | 64.5 | 950 | 200 | 73.0 | 1080 | 290 |
| 50 | 63.7 | 900 | 220 | 70.0 | 1400 | 320 |
| 55 | 70.0 | 850 | 220 | 75.9 | 1080 | 310 |
| 80 | 72.5 | 870 | 220 | 96.4 | 1300 | 370 |
| 90 | 80.2 | 970 | 200 | 96.4 | 1100 | 310 |
| 105 | 73.0 | 850 | 160 | 92.1 | 1375 | 330 |
| 120 | 78.0 | 1025 | 180 | 96.8 | 1600 | 390 |

Table 1 shows how the exceptional casing elasticity properties of products based on abaca paper substrates, wet-strengthened by regenerated cellulose from viscose, together with a small amount of a polyamide epichlorohydrin resin, in the 13.0 to 15.4 g/m² basis weight range, and possessing paper cross direction wet stretch levels in the 9.6 to 13.2% range, are essentially reproduced in casings of similar overall basis weight but based on abaca paper substrate wet-strengthened by resins, without the use of ragene-rated cellulose from viscose, which possess cross direction wet stretch levels of 6.7 to 9.2% but of significantly lower substrate paper basis weights in the 10.2 to 13 g/m² range. Elasticity is here defined as the capacity of the casing, after soaking in water at 40 degree Celsius for minutes, to expand from an uninflated condition to one of inflation by 30 kPa air pressure, expressed as a percentage of the starting size. Generally speaking two aspects of light-weight casing construction are demonstrated by the data of Table 1, viz, that for a given size of casing, casing elasticity follows paper cross direction stretch at the same paper basis weight but that lower paper cross stretch can be compensated by lower paper basis weight to preserve casing elasticity levels when switching from a viscose and/or viscose plus resin(s)-bonded to a resin-bonded substrate, but not without fully taking into account casing machine tension effects, etc., as described above. Casing burst strengths for the new products based on resin-bonded paper compare favorably to those based on viscose-bonded paper in terms of strength per unit weight of substrate. Data is collected in Table 2, page 20, to illustrate this: greater absolute strength is obtained for heavier substrate paper, but relative to paper weight, greater burst coefficients are obtained for the lighter substrates.

Casing smoothness properties as determined using the Bendtsen method are shown in Table 3, page 21, for light-weight casings produced from viscose plus resin(s) and resin(s)-bonded paper substrates. The original specification pointed to significant differences between the Bendtsen smoothness properties of fibrous casings produced in accordance with the prior art based on heavy-weight paper substrates of 17 to 23 g/m², and the light-weight viscose-bonded paper substrates of 13 to 15 g/m², the subject of Table 3A. While the latter showed the lighter weight paper substrates gave rise to casings of smoother inside surfaces compared to those of the prior art, the results of the present application show there are no significant differences between viscose and/or resin(s)-bonded paper substrates, in the 11.0 to 14.5 g/m² interval of paper substrate basis weight, incorporated in casings of 64.0 to 74.7 g/m².

What is claimed is:

1. A method for manufacturing a fibrous cellulose sausage casing having a burst coefficient in the range 8.5–11.1, the burst coefficient being $(b \cdot d \cdot \pi)/100 w$, wherein b is the burst strength, d is the casing diameter, and w is the paper base weight, and an elasticity in the range 13.2 to 19.2% of the starting size, the elasticity being defined as the capacity of the casing, after soaking in water at 40° C. for 10 minutes, to expand from an uninflated condition to one of inflation by 30 kPa air pressure, which method comprises:
   a) forming a wet-strengthened manila based paper material, which paper is wet-strengthened by at least one strengthener selected from the group consisting of i) synthetic resin(s) of polyamide epihalohydrin type, ii) viscose, and iii) a combination of synthetic resin(s) of polyamide epihalohydrin type and viscose, into the shape of a tubing, the air-dry weight of which wet-strengthened paper is from 10 to 15 g/m²;
   b) impregnating said tubing with viscose by presenting said viscose only to an outer surface of said tubing;
   c) coagulating the viscose into cellulose by passing the impregnated tubing through at least one acid and salt bath; and
   d) plasticizing the treated tubing.

2. The method of claim 1, wherein the paper is wet-strengthened essentially by viscose.

3. The method of claim 2, wherein the weight of the wet-strengthened paper is from 13 to 15 g/m².

4. The method of claim 1, wherein the paper is wet-strengthened only by synthetic resin(s) of polyamide epihalohydrin type.

5. The method of claim 4, wherein the weight of the wet-strengthened paper is from 10 to 15 g/m².

6. The method of claim 4, wherein the weight of the wet-strengthened paper is from 10 to 13 g/m².

7. The method of claim 4, wherein said step of impregnating with viscose comprises:
   a) feeding the viscose under pressure through the lips of a die directly onto the outer surface of said tubing and through the wet-strengthened paper;
   b) supporting the paper on its underside during transit across the lips by a metal ring or cylinder, wherein the distance between the faces of the lips and the surface of the supporting ring is 0.5 to 0.7 mm and allows the paper to pass unimpeded; and
   c) impregnating the paper by continuing the passage of the tube between die and supporting ring or cylinder for a predetermined distance within fixed cap dimensions, thereby continuously impregnating the paper.

8. The method of claim 7, wherein the distance between the faces of the lips and a surface of the supporting ring is 0.55 to 0.66 mm.

9. The method of claim 7, wherein the length of the supporting ring is from 10 to 25 mm, which extends to a distance horizontal to a lower end of a lower lip of the die.

10. The method of claim 7, wherein the die has an annular opening in its lower part thereby permitting the viscose to be fed in the lower part of the die.

11. The method of claim 7, wherein the paper lead-in distance between the paper supporting ring or cylinder and an upper end of an upper lip of the viscose die, to the point of the viscose issue at a lower end of an upper lip is between 5 and 10 mm, while the paper lead-out distance, between the point of viscose issue and a lower end of a lower lip is between 2 and 10 mm.

* * * * *

UNITED STATES PATENT AND TRADEMARK OFFICE
CERTIFICATE OF CORRECTION

PATENT NO.     : 6,514,553 B1
DATED          : February 4, 2003
INVENTOR(S)    : Boris Hoglund It is certified that error appears in the above-identified patent and that said Letters Patent is hereby corrected as shown below:

<u>Title page,</u>
Item [73], "Oy Visco AB" should be -- Oy Visko AB --

Signed and Sealed this

Fifth Day of August, 2003

JAMES E. ROGAN
*Director of the United States Patent and Trademark Office*